United States Patent
Harada et al.

(10) Patent No.: US 6,808,697 B2
(45) Date of Patent: Oct. 26, 2004

(54) SPHERICAL TETRAGONAL BARIUM TITANATE PARTICLES AND PROCESS FOR PRODUCING THE SAME

(75) Inventors: Toshiharu Harada, Ube (JP); Yuji Mishima, Ube (JP); Seiji Okazaki, Onoda (JP); Haruki Kurokawa, Hiroshima (JP); Hidetomo Unemoto, Ube (JP); Kazuyoshi Murashige, Yamaguchi-ken (JP); Manabu Matsumoto, Onoda (JP); Tadashi Kanasaku, Ube (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 122 days.

(21) Appl. No.: 09/986,657

(22) Filed: Nov. 9, 2001

(65) Prior Publication Data

US 2002/0090335 A1 Jul. 11, 2002

(30) Foreign Application Priority Data

Nov. 13, 2000 (JP) ........................................ 2000-345732

(51) Int. Cl.$^7$ ........................... C01G 23/00; C01F 11/00
(52) U.S. Cl. ........................................................ 423/598
(58) Field of Search .......................................... 423/598

(56) References Cited

U.S. PATENT DOCUMENTS 4,829,033 A * 5/1989 Menashi et al. ............. 423/598
4,968,498 A * 11/1990 Wautier et al. .............. 423/593
5,445,806 A    8/1995 Kinugasa et al.
5,900,223 A * 5/1999 Matijevic et al. ........... 423/263

FOREIGN PATENT DOCUMENTS

JP           5-330824       * 12/1993

OTHER PUBLICATIONS

Uchino et al: "Dependence of the Crystal Structure on Particle Size in Barium Titanate," pp. 1555–1558, *J. Am Ceram. Soc.*, 72 1555–58 (1989), no month.
Vivekanandan et al: "Characterization of Barium Titanate Fine Powders Formed From Hydrothermal Crystallization," Powder Technology, 57 (1989) pp. 181–192, no month.
Begg et al: "Effect of Particle Size on the Room–Temperature Crystal Structure of Barium Titanate," pp. 3186–3192, *J. Am. Ceram. Soc.*, 77 3186–92 (1994), no month.
Ikawa et al: "Size Effect on Low Temperature Phase Transformations in $BaTiO_3$ Fine Powders Analyzed by Heat Capacity," Dept. of App. Chemistry Book 1 pp. 447–450, no date.

* cited by examiner

*Primary Examiner*—Steven Bos
(74) *Attorney, Agent, or Firm*—Nixon & Vanderhye P.C.

(57) ABSTRACT

Spherical tetragonal barium titanate particles of the present invention have a perovskite crystal structure, an average particle diameter of 0.05 to 0.5 μm, a particle size distribution σg of not less than 0.70, and a ratio of Ba to Ti of 0.99:1 to 1.01:1. The spherical tetragonal barium titanate particles exhibit an excellent dispersibility as well as a high denseness, a high purity and excellent permittivity properties.

5 Claims, 9 Drawing Sheets

⊢―――――⊣ 1.0μm

⊢——————⊣ 1μm

⊢——————⊣ 1.0μm

SPHERICAL TETRAGONAL BARIUM TITANATE PARTICLES AND PROCESS FOR PRODUCING THE SAME

BACKGROUND OF THE INVENTION

The present invention relates to spherical tetragonal barium titanate particles and a process for producing the spherical tetragonal barium titanate particles, and more particularly, to spherical tetragonal barium titanate particles having an average particle diameter as small as 0.05 to 0.5 µm and a Ba/Ti ratio of 0.99:1 to 1.01:1.

With recent tendency toward miniaturization, high-performance and lightening of various electronic apparatuses, it has been required to improve characteristics of dielectric materials used in parts of these electronic apparatuses such as multi-layered ceramic capacitors or the like.

As known in the art, in many conventional multi-layered ceramic capacitors, there have been used barium titanate particles which are a perovskite compound having a high permittivity constant. The barium titanate particles, especially those used in the multi-layered ceramic capacitors, have been required to be free from agglomeration and have an excellent dispersibility as well as a high denseness, a high purity and excellent permittivity properties, since such particles are mixed with a binder upon the production of the multi-layered ceramic capacitors.

In order to satisfy the above requirements, the barium titanate particles have also been required to have a spherical shape and a sharp particle size distribution. Further, in the consideration of high permittivity properties, it has been required that the barium titanate particles have a ratio of Ba to Ti (Ba/Ti ratio) as close to 1.0:1 as possible, and exhibit a tetragonal crystal system.

As the conventional production process of the barium titanate particles, there are known a solid-phase reaction method of mixing a titanium compound with a barium compound and then calcining the resultant mixture at an elevated temperature of not less than 1,000° C., and a wet method of reacting barium and titanium with each other in a solution thereof.

However, the barium titanate particles obtained by the solid-phase reaction method not only have a large average particle diameter, but also are deteriorated in particle size distribution and fail to show a suitable particle shape for improved dispersibility since the particles are produced by pulverizing calcined particles. For this reason, the wet method has been more favorably used for the production of the barium titanate particles.

In the wet method, in order to obtain barium titanate particles having a Ba/Ti ratio as close to 1.0 as possible, it is necessary to add an excess amount of Ba to Ti. As to this fact, in "Journal of Japan Chemical Society", No. 7, p. 1155 (1974), it is apparently described that "The use of a relatively large amount of $Ba^{2+}$ is needed to produce $BaTiO_3$ having a Ba/Ti ratio of 1. The studies have showed that a mixture to be reacted is required to have a Ba/Ti ratio of 8 in order to produce barium titanate having a Ba/Ti ratio of 1. When the Ba/Ti ratio in the mixture is less than 8, the obtained barium titanate is insufficient in barium content".

In addition, in order to obtain tetragonal barium titanate particles, it is required to transform cubic particles into tetragonal ones by heating the former particles at an elevated temperature of not less than 800° C. However, when heat-treated at such an elevated temperature, the particles tend to be sintered together, and the obtained barium titanate particles tend to show a polygonal shape and a poor particle size distribution.

Conventional wet-reaction processes for producing barium titanate particles are described, for example, in Japanese Patent Application Laid-Open (KOKAI) Nos. 61-31345(1986) and 62-72525(1987), Japanese Patent No. 2,999,821 and Japanese Patent Application Laid-Open (KOKAI) Nos. 5-330824(1993) and 8-119745(1996). Further, in Japanese Patent Application Laid-Open (KOAKI) Nos.61-111957(1986) and 7-330427(1995) and Japanese translation of International Patent Application Laid-Open (KOHYO) No. 2000-509703, it is described that barium titanate particles are coated with silica or the like.

At present, it has been strongly required to provide barium titanate particles satisfying the above requirements. However, such barium titanate particles have not been obtained until now.

That is, in the method described in Japanese Patent Application Laid-Open (KOKAI) No. 61-31345(1986), after producing barium titanate particles, unreacted barium is insolubilized to ensure the production of barium titanate particles having a Ba/Ti ratio of 1.00. However, the thus obtained barium titanate particles are in the form of a mixture of cubic barium titanate and other Ba compounds. Therefore, in order to transform the cubic barium titanate into a tetragonal barium titanate as a single substance, it is necessary to conduct the transformation at a very high temperature as used in the conventional solid-phase reaction. Further, the thus-produced tetragonal barium titanate particles tend to be deteriorated in particle size distribution.

In Japanese Patent Application Laid-Open (KOKAI) No. 62-72525(1987), there is described the method of dissolving a barium compound in a titanium tetrachloride solution and then adding an aqueous alkali solution to the resultant solution to hydrothermally produce barium titanate particles. However, the calcined product of the obtained barium titanate particles does not have a single structure and, therefore, fails to show high permittivity properties, as described in Comparative Examples hereinafter.

Also, in Japanese Patent No. 2,999,821, there is described the method of reacting an excess amount of barium with titanium to produce barium titanate particles, and then after calcining, washing the resultant barium titanate particles with an acid to remove the excess barium therefrom. However, the obtained particles have a rectangular parallelopiped shape. Further, since barium contained in the barium titanate crystal tends to be eluted out by the acid-washing, it is difficult to stably control the Ba/Ti ratio. In addition, the acid-washing tends to cause the deterioration in crystal structure of the surface of the barium titanate particles.

In Japanese Patent Application Laid-Open (KOAKI) No. 5-330824(1993), there is described the method of subjecting a titanium compound and a barium compound to wet-reaction by adding an aqueous hydrogen peroxide solution thereto. However, the obtained barium titanate particles exhibit a cubic crystal system and, therefore, must be calcined for transforming into tetragonal barium titanate particles. Further, in the paragraph [0071] of this KOKAI, it is described that "tetragonal barium titanate is obtained by calcining the cubic particles at a temperature of 900 to 1,300° C. In this case, when the calcining temperature is low and the calcined particles have a large particle diameter, the obtained particles have a spherical shape. On the contrary, when the particle size is small and the calcining temperature is high, the obtained particles are phase particles having a rectangular parallelopiped shape". Thus, in the case of barium titanate particles having a small average particle diameter, especially those having an average particle size as fine as not more than 0.5 μm, it is difficult to obtain spherical tetragonal barium titanate particles.

Further, as described in Comparative Examples later, when the cubic barium titanate having a Ba/Ti ratio of 1.02, which was produced by water-washing, filtering and drying the wet-reaction product according to the method described in Example 5 of Japanese Patent Application Laid-Open (KOAKI) No. 5-330824(1993), was calcined at a temperature of 1,020° C., and the obtained calcined particles were measured by X-ray diffraction method, it was confirmed that a peak attributed to substance other than $BaTiO_3$ (probably $BaTi_3O_7$) was observed. Thus, the obtained calcined particles are not phase particles and, therefore, fail to show excellent permittivity properties.

In Japanese Patent Application Laid-Open (KOAKI) No. 8-119745(1996), there is described the method of subjecting a mixture of barium hydroxide and titanium hydroxide to hydrothermal reaction to obtain barium titanate particles. However, the obtained particles exhibit a cubic crystal system. Further, when such cubic particles are calcined, the obtained particles are not single crystal particles and, therefore, are deteriorated in permittivity properties, as described in Comparative Examples later.

In Japanese Patent Application Laid-Open (KOAKI) No. 61-111957(1986), there is described the method of calcining a mixture containing a low-melting material composed of an oxide of an element selected from the group consisting of Bi, B, Pb and W, and cubic barium titanate. However, upon calcination of the cubic barium titanate, the low-melting material is reacted with the cubic barium titanate, thereby partially forming a solid solution therebetween. Thus, the obtained particles tend to be deteriorated in permittivity properties.

In Japanese Patent Application Laid-Open (KOAKI) No. 7-330427(1995), there is described the method of coating the surface of barium titanate particles with alumina and calcining the resultant coated particles together with a glass component added thereto. However, in this KOAI, it is also described that when the amount of the glass component added is small, the obtained particles suffer from generation of voids due to the reaction and are deteriorated in permittivity properties. Thus, in Japanese Patent Application Laid-Open (KOKAI) No. 7-330427(1995), there is no suggestion that the permittivity properties of barium titanate particles can be improved merely by addition of a small amount of silica.

Further, in Japanese translation of International Patent Application Laid-Open (KOHYO) No. 2000-509703, there are described barium titanate particles whose surface is coated with metal oxide, hydrated metal oxide, metal hydroxide or an organic acid salt. However, the object of this KOHYO is to improve the dispersibility of particles by controlling the surface coat formed thereon and the particle size distribution thereof. Therefore, there is neither suggestion as to anti-sintering effect nor teachings as to crystal system and crystallinity.

In addition, in Japanese Patent No. 3,146,961, it is described that a Si component is incorporated into barium titanate particles. However, there is no suggestion as to crystal system. Also, since the Si component forms a solid solution with the barium titanate, the obtained particles tend to be deteriorated in permittivity properties because of reduction in components contributing to improvement of the permittivity properties.

As a result of the present inventors' earnest studies for solving the above problems, it has been found that by adding an aqueous barium salt solution to a titanium hydroxide colloid in the presence of carboxylic acid in an amount of 1 to 60 mol % based on the mole of barium contained in the aqueous barium salt solution, thereby producing barium titanate starting particles; hydrothermally treating a resultant reaction solution containing the barium titanate starting particles at a temperature of 100 to 300° C., thereby obtaining spherical cubic barium titanate particles; and after washing, calcining the spherical cubic barium titanate particles at a temperature of 500 to 1,200° C., the obtained spherical tetragonal barium titanate particles are free from agglomeration, and can exhibit an excellent dispersibility as well as a high denseness, a high purity and excellent permittivity properties. The present invention has been attained on the basis of this finding.

SUMMARY OF THE INVENTION

It is an object of the present invention to provide spherical tetragonal barium titanate particles which are free from agglomeration, and can exhibit an excellent dispersibility as well as a high denseness, a high purity and excellent permittivity properties.

To accomplish the aims, in a first aspect of the present invention, there are provided spherical tetragonal barium titanate particles with a perovskite crystal structure, having an average particle diameter of 0.05 to 0.5 μm, a particle size distribution σg of not less than 0.70, and a ratio of Ba to Ti of 0.99:1 to 1.01:1.

In a second aspect of the present invention, there are provided spherical tetragonal barium titanate particles with a perovskite crystal structure, having an average particle diameter of 0.05 to 0.5 μm, a particle size distribution σg of not less than 0.70, and a ratio of Ba to Ti of 0.99:1 to 1.01:1;

which are coated with an oxide of at least one element selected from the group consisting of Si, Y and Nd, in an amount of 0.01 to 3.0% by weight based on the weight of the spherical tetragonal barium titanate particles.

In a third aspect of the present invention, there is provided a process for producing the spherical tetragonal barium titanate particles as defined in claim 1, which process comprises:

adding an aqueous barium salt solution to a titanium hydroxide colloid in the presence of a carboxylic acid in an amount of 1 to 60 mol % based on barium contained in the aqueous barium salt solution, thereby producing barium titanate starting particles;

hydrothermally treating a resultant reaction solution containing the barium titanate starting particles at a temperature of 100 to 350° C., thereby obtaining spherical cubic barium titanate particles; and calcining the spherical barium titanate particles at a temperature of 500 to 1,200° C. to transform the spherical cubic barium titanate particles into the spherical tetragonal barium titanate particles.

In a fourth aspect of the present invention, there is provided a process for producing the spherical tetragonal barium titanate particles as defined in claim 1, which process comprises:

adding an aqueous barium salt solution to a titanium hydroxide colloid in the presence of a carboxylic acid in an amount of 1 to 60 mol % based on barium contained in the aqueous barium salt solution, thereby producing barium titanate starting particles;

hydrothermally treating a resultant reaction solution containing the barium titanate starting particles at a temperature of 100 to 350° C., thereby obtaining spherical cubic barium titanate particles;

coating the surface of the spherical cubic barium titanate particles with an anti-sintering agent composed of a compound of at least one element selected from the group consisting of Si, Y and Nd;

calcining the coated spherical cubic barium titanate particles are calcined at a temperature of 800 to 1,200° C. to transform the spherical cubic barium titanate particles into the spherical tetragonal barium titanate particles.

In a fifth aspect of the present invention, there is provided a dielectric material comprising the spherical tetragonal barium titanate particles with a perovskite crystal structure, having an average particle diameter of 0.05 to 0.5 μm, a particle size distribution σg of not less than 0.70, and a ratio of Ba to Ti of 0.99:1 to 1.01:1.

In a sixth aspect of the present invention, there is provided a dielectric material comprising the spherical tetragonal barium titanate particles with a perovskite crystal structure, having an average particle diameter of 0.05 to 0.5 μm, a particle size distribution σg of not less than 0.70, and a ratio of Ba to Ti of 0.99:1 to 1.01:1;

which are coated with an oxide of at least one element selected from the group consisting of Si, Y and Nd, in an amount of 0.01 to 3.0% by weight based on the weight of the spherical tetragonal barium titanate particles.

In a seventh aspect of the present invention, there is provided a multi-layered ceramic capacitor having the dielectric material comprising the spherical tetragonal barium titanate particles with a perovskite crystal structure, having an average particle diameter of 0.05 to 0.5 μm, a particle size distribution σg of not less than 0.70, and a ratio of Ba to Ti of 0.99:1 to 1.01:1.

In an eighth aspect of the present invention, there is provided a multi-layered ceramic capacitor having the dielectric material comprising the spherical tetragonal barium titanate particles with a perovskite crystal structure, having an average particle diameter of 0.05 to 0.5 μm, a particle size distribution σg of not less than 0.70, and a ratio of Ba to Ti of 0.99:1 to 1.01:1;

which are coated with an oxide of at least one element selected from the group consisting of Si, Y and Nd, in an amount of 0.01 to 3.0% by weight based on the weight of the spherical tetragonal barium titanate particles.

In a ninth aspect of the present invention, there are provided spherical tetragonal barium titanate particles with a perovskite crystal structure, having an average particle diameter of 0.05 to 0.5 μm, a particle size distribution σg of not less than 0.70, a ratio of Ba to Ti of 0.99:1 to 1.01:1, a sphericity (maximum diameter/minimum diameter) of from 1.0 to less than 2.0 and a BET specific surface area value of 2 to 20 m²/g.

In a tenth aspect of the present invention, there are provided spherical tetragonal barium titanate particles with a perovskite crystal structure, having an average particle diameter of 0.05 to 0.5 μm, a particle size distribution σg of not less than 0.70, a ratio of Ba to Ti of 0.99:1 to 1.01:1, a sphericity (maximum diameter/minimum diameter) of from 1.0 to less than 2.0 and a BET specific surface area value of 2 to 15 m²/g, which are coated with an oxide of at least one element selected from the group consisting of Si, Y and Nd, in an amount of 0.01 to 3.0% by weight based on the weight of the spherical tetragonal barium titanate particles.

DETAILED DESCRIPTION OF THE INVENTION

Figure 1:
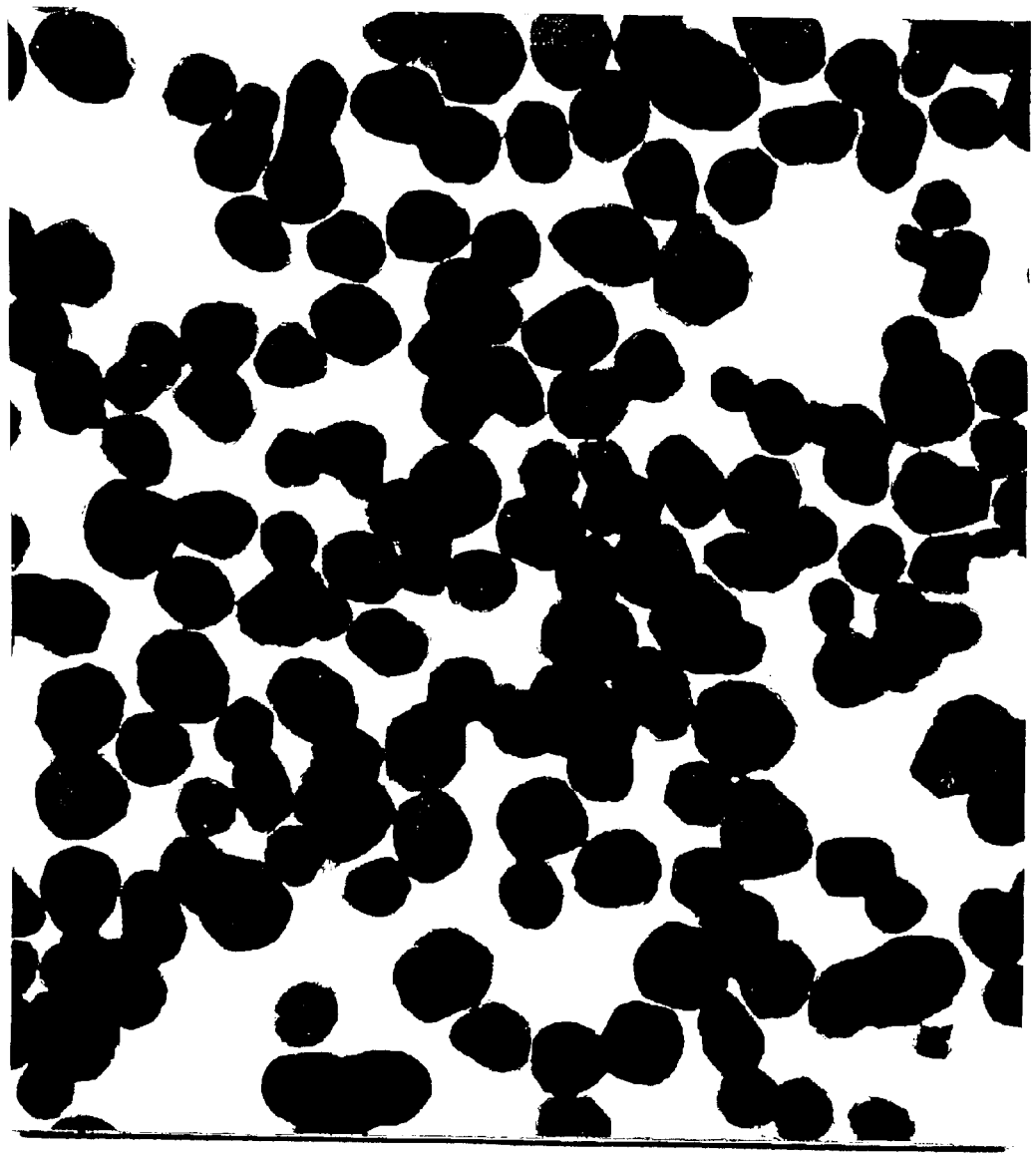
FIG. 1 is a TEM micrograph (×20,000) showing a shape of spherical tetragonal barium titanate particles obtained in Example 1.

The present invention will be described in detail below.

First, the spherical tetragonal barium titanate particles of the present invention are described.

The spherical tetragonal barium titanate particles of the present invention have an average particle diameter of usually 0.05 to 0.5 μm, preferably 0.05 to 0.4 μm; a particle size distribution σg of usually not less than 0.7, preferably not less than 0.75. The upper limit of the particle size distribution is preferably 0.9.

When the average particle diameter is less than 0.05 μm, the molded product obtained from the spherical tetragonal barium titanate particles exhibits a low packing density and a high shrinkage upon sintering. When the average particle diameter is more than 0.5 μm, it is difficult to obtain a thin dielectric layer for multi-layered ceramic capacitors.

When the particle size distribution σg is less than 0.7, the dielectric layer for multi-layered ceramic capacitors obtained from such particles has a non-uniform thickness due to the existence of coarse particles.

The spherical tetragonal barium titanate particles of the present invention have a sphericity (maximum diameter/minimum diameter) of usually from 1 to less than 2, preferably 1.0 to 1.4, more preferably 1.0 to 1.3.

The spherical tetragonal barium titanate particles of the present invention have a BET specific surface area of preferably 2 to 20 $m^2/g$, more preferably 2 to 15 $m^2/g$, still more preferably 2 to 10 $m^2/g$. When the BET specific surface area is less than 2 $m^2/g$, the obtained particles become coarse or suffer from sintering therebetween. When such particles are mixed with a binder, the dispersibility thereof tends to be deteriorated. When the BET specific surface area is more than 20 $m^2/g$, the obtained particles tend to be agglomerated together by increase in agglomeration strength thereof du to such fine particles, resulting in deteriorated dispersibility thereof.

The spherical tetragonal barium titanate particles of the present invention have a ratio of Ba to Ti (Ba/Ti ratio) of usually 0.99:1 to 1.01:1, preferably 0.99:1 to 1.008:1. When the Ba/Ti ratio is out of the above-specified range, it may be difficult to obtain barium titanate particles having high permittivity properties as aimed by the present invention.

The spherical tetragonal barium titanate particles of the present invention exhibit a tetragonal crystal system. When the particles exhibit a cubic crystal system, the barium titanate particles when calcined, are deteriorated in physical and electric properties because of insufficient crystallinity thereof. In particular, the multi-layered ceramic capacitors produced from such particles fail to show good physical and electric properties required for capacitors.

As to the tetragonality of the spherical tetragonal barium titanate particles of the present invention, the value of $((c/a)-1) \times 10^3$, wherein 'a' and 'c' are lattice constants for respective 'a' and 'c' crystal axes, is preferably not less than 5, more preferably not less than 6. In case of the barium titanate particles non-coated with an anti-sintering agent, the upper limit of the value of $((c/a)-1) \times 10^3$ is preferably 14. In case of the barium titanate particles coated with an anti-sintering agent, the upper limit of the value of $((c/a)-1) \times_{10}^3$ is preferably 16, more preferably 15, and the lower limit thereof preferably 7. The closer to zero the above crystallinity value $[((c/a)-1) \times 10^3]$, the more cubic, i.e., the more unsuitable the crystal system of the particles becomes.

The surface of the spherical tetragonal barium titanate particles of the present invention may be coated with an oxide of at least one element selected from the group consisting of Si, Y and Nd.

The amount of the oxides of Si or the like coated is preferably 0.01 to 3.0% by weight, more preferably 0.01 to 1.5% by weight, still more preferably 0.02 to 0.5% by weight based on the weight of the spherical tetragonal barium titanate particles.

When the amount of the oxides of Si or the like coated is less than 0.01% by weight, it may be difficult to obtain the aimed anti-sintering effect. When the amount of the oxides of Si or the like coated is more than 3.0% by weight, the anti-sintering effect is already saturated, and the capacity of finally produced capacitors is rather deteriorated. Therefore, the use of such a large amount of the anti-sintering agent is unnecessary and meaningless.

In the present invention, since the amount of the anti-sintering agent coated is very small, the obtained coated spherical tetragonal barium titanate particles have substantially the same particle size as that of the barium titanate particles before calcining. The barium titanate particles before calcining preferably have an average particle diameter of 0.05 to 0.5 μm and a particle size distribution σg of not less than 0.70.

Next, the process for producing the spherical tetragonal barium titanate particles according to the present invention is described.

The spherical tetragonal barium titanate particles of the present invention can be produced by adding an aqueous barium salt solution to a titanium hydroxide colloid in the presence of a carboxylic acid in an amount of usually 1 to 60 mol % based on barium contained in the aqueous barium salt solution, thereby producing barium titanate starting particles; hydrothermally treating a resultant reaction solution containing the barium titanate starting particles at a temperature of usually 100 to 350° C., thereby obtaining spherical cubic barium titanate particles; and after washing, calcining the spherical cubic barium titanate particles at a temperature of usually 500 to 1,200° C. to transform the spherical cubic barium titanate particles into the spherical tetragonal barium titanate particles.

The titanium hydroxide colloid used in the present invention may be produced by neutralizing an aqueous titanium salt solution with an aqueous alkali solution. As the aqueous titanium salt solution, there may be used aqueous solutions of titanium tetrachloride, titanium sulfate or the like.

As the aqueous alkali solution, there may be used an aqueous sodium hydroxide solution, an aqueous potassium hydroxide solution, ammonia water or the like.

The amount of the aqueous alkali solution added is 1.0 to 1.5 moles based on one mole of titanium used.

Examples of the aqueous barium salt solution usable in the present invention may include aqueous solutions of barium hydroxide, barium chloride, barium nitrate or the like. The barium salts other than barium hydroxide are preferably used in the form of a basic solution by neutralizing with the aqueous alkali solution.

Examples of the carboxylic acid usable in the present invention may include propionic acid, acetic acid or salts thereof.

The amount of the carboxylic acid added is usually 1 to 60 mol % based on barium contained in the aqueous barium salt solution. When the amount of the carboxylic acid added is less than 1 mol %, the effect by the addition thereof cannot be sufficiently exhibited. When the amount of the carboxylic acid added is more than 60 mol %, the effect is already saturated and, therefore, the addition of such a large amount of the carboxylic acid is unnecessary and meaningless. The amount of the carboxylic acid added is preferably in the range of 3 to 50 mol %.

The carboxylic acid may be added to either the aqueous alkali solution or a titanium hydroxide colloid ($TiO_2 \cdot nH_2O$) containing reaction solution prepared by reacting an aqueous titanium salt solution with the aqueous alkali solution.

The ratio of barium to titanium (Ba/Ti) charged is preferably 1.00:1 to 1.10:1, more preferably 1.00:1 to 1.08:1, still more preferably 1.00:1 to 1.06:1. When the ratio is less than 1.00:1, the production percentage of the barium titanate particles is lessened. Also, when the ratio exceeds 1.10:1, the barium titanate particles exhibiting the cubic crystal system may be easily be produced.

In the present invention, after adding the aqueous barium salt solution, the resultant mixed solution is preferably aged. The aging can enhance the effect obtained by the addition of the carboxylic acid. The aging temperature is usually 40 to 100° C., preferably 60 to 100° C. The aging time is preferably 0.5 to 5 hours. When the aging time is less than 0.5 hour, a sufficient effect may not be obtained. When the aging time is more than 5 hours, the process may become industrially disadvantageous.

In the process of the present invention, it is required that nitrogen is flowed through the reaction system so as to prevent the barium compound from being reacted with carbon dioxide gas in air or the like.

The barium titanate starting particles have an average particle diameter of preferably 0.01 to 0.50 μm.

Then, the reaction solution containing the barium titanate starting particles is subjected to hydrothermal treatment. The reaction temperature used in the hydrothermal treatment is preferably 100 to 350° C. When the reaction temperature is less than 100° C., it may difficult to obtain dense spherical tetragonal barium titanate particles. When the reaction temperature is more than 350° C., such a treatment may be industrially disadvantageous. The reaction temperature used in the hydrothermal treatment is preferably 120 to 300° C.

The, the particles obtained by the hydrothermal treatment are washed with water and dried by conventional methods. By washing with water, excess barium together with impurities such as sodium and Cl is removed from the thus hydrothermally-treated particles.

The particles obtained after the hydrothermal treatment and water-washing are spherical cubic barium titanate particles having an average particle diameter of usually 0.01 to 0.50 μm and a Ba/Ti ratio of usually 0.99 to 1.01.

The spherical cubic barium titanate particles are then calcined at a temperature of usually 500 to 1,200° C., preferably 800 to 1,150° C. in order to transform the cubic particles into tetragonal particles. When the temperature is less than 500° C., it is difficult to transform the cubic particles into the tetragonal particles. The calcination can be sufficiently conducted in a temperature range of 500 to 1,200° C. to transform the cubic particles into the tetragonal particles and, therefore, it is unnecessary to raise the temperature more than necessary.

Alternatively, before the calcination, the surface of the spherical cubic barium titanate particles may be coated with a predetermined amount of the anti-sintering agent comprising a compound of at least one element selected from the group consisting of Si, Y and Nd. The coating with the anti-sintering agent can be conducted after the washing treatment or drying treatment. Then, the thus coated spherical cubic barium titanate particles may be calcined at a temperature of 800 to 1,200° C. in order to transform the cubic particles into the tetragonal particles.

As the anti-sintering agent, inorganic compounds and organic compounds may be usable. The anti-sintering agent is changed to oxides during the calcination as described later. The compounds of Si, Y and Nd used as the anti-sintering agent may be in the form of any of salts, oxides, hydroxides and oxide hydroxides of these elements.

The coating treatment may be conducted by either a dry method or a wet method. Among the methods, the wet-method is preferred.

The wet-coating treatment may be conducted by ordinary methods, for example, by a method of adding an anion-containing compound to a suspension containing the spherical barium titanate particles to produce a less-soluble precipitate of Si, Y and Nd, thereby depositing the precipitate on the surface of the spherical barium titanate particles; a method of hydrolyzing organosilicic acid compounds such as 3-aminopropyltriethoxysilane; or the like.

The dry-coating method may also be conducted by ordinary methods, for example, by a method of absorbing a silane-based coupling agent onto the surface of the spherical barium titanate particles by mechanochemical reaction using a dry-type mixing pulverizer, or the like.

Examples of the preferred Si compounds used in the coating treatment may include water glass #3, sodium orthosilicate and sodium metasilicate as well as organosilicic acid compounds such as ethyl silicate, 3-aminopropyltriethoxysilane and the like. Examples of the preferred Y compounds may include yttrium nitrate, yttrium chloride or the like. Examples of the preferred Nd compounds may include neodymium nitrate, neodymium chloride or the like.

The amount of the anti-sintering agent treated is 0.01 to 3.0% by weight based on the weight of the spherical barium titanate particles.

Then, the spherical barium titanate particles surface-treated with the anti-sintering agent is calcined at a temperature of 800 to 1,200° C. to transform the crystal system thereof into a tetragonal. When the calcination temperature is in the range of 500 to 800° C., it is difficult to impart a sufficient crystallinity to the particles though the particles are transformed into the tetragonal. When the calcination is conducted at a temperature of 800 to 1,200° C., the particles can be sufficiently transformed into the tetragonal having a high crystallinity. Therefore, it is unnecessary to raise the calcination temperature more than necessary. The calcination temperature is preferably 900 to 1,150° C.

The dielectric composition of the present invention comprises the spherical tetragonal barium titanate particles.

Further, the multi-layered ceramic capacitor of the present invention may be produced by ordinary methods, for example, the below-mentioned method. That is, the above dielectric composition is first blended with various additives and then with a solvent and a binder to obtain a slurry. The slurry is formed into a green sheet. The green sheet is printed using a printer to form internal electrodes thereon, cut out and then pressed for lamination and pressure-bonding. After the thus obtained green chip is calcined, external electrodes are connected thereto to prepare a complete multi-layered ceramic capacitor.

The point of the present invention is that since the spherical barium titanate particles of the present invention have not only a Ba/Ti ratio of usually 0.99:1 to 1.01:1 and an average particle diameter as fine as usually 0.05 to 0.50 μm, but also a spherical shape, an excellent particle size distribution and a tetragonal crystal system having a high crystallinity, the particles can exhibit an excellent dispersibility and a high permittivity constant.

The reason why the barium titanate particles of the present invention can show a Ba/Ti ratio close to 1.00:1, is considered as follows. That is, since the carboxylic acid is previously added to the titanium hydroxide colloid, the subsequently added barium can be effectively absorbed into the colloid, resulting in the production of uniform barium titanate particles.

The reason why the spherical tetragonal particles can be obtained, is considered as follows, though not clearly determined. That is, since the barium can be effectively absorbed into the titanium hydroxide colloid by the above-described reason, and the crystallinity of the particles can be enhanced by the hydrothermal treatment, the calcination of the particles can be conducted at a low temperature. As a result, the low-temperature calcination prevents the particles from being sintered together, so that the crystal system of the particles can be transformed into a tetragonal while maintaining the spherical particle shape thereof before the calcination.

The reason why the dielectric composition of the present invention can show an excellent particle size distribution, is considered as follows. That is, since the carboxylic acid is previously added to the titanium hydroxide colloid, barium can be effectively absorbed into the titanium hydroxide colloid, thereby obtaining uniform barium titanate starting particles. Then, the crystallinity of the particles can be enhanced by the hydrothermal treatment, and the sintering between the particles upon the calcination can be prevented by coating the surface of the particles with the anti-sintering agent. For these reasons, it is suggested that the crystal system of the particles can be transformed into a tetragonal while maintaining the spherical particle shape before the calcination.

The reason why the tetragonal barium titanate particles coated with the anti-sintering agent can show a high crystallinity, is considered as follows. That is, it is considered that the sintering between the particles can be more effectively prevented by coating the surface of the cubic barium titanate particles with the anti-sintering agent, even when calcined at a higher temperature.

In general, upon the production of multi-layered ceramic capacitors, barium titanate particles are blended with a glass component or the like, and the resultant mixture is substantially calcined to form a core/shell structure comprising a core composed of the barium titanate particles and a shell composed of the glass component or the like, the shell being in the form of a coat formed on the surface of the barium titanate particles. When the dielectric composition of the present invention is used, the multi-layered ceramic capacitor can be produced while maintaining inherent properties of barium titanate as the core without formation of a solid solution between the barium titanate and impurities, because the surface of the barium titanate particles is coated with the anti-sintering agent. Therefore, the thus obtained multi-layered ceramic capacitor can show not only a more high permittivity constant, but also a more low temperature dependency.

The spherical tetragonal barium titanate particles of the present invention are fine tetragonal particles having a Ba/Ti ratio of 0.99 to 1.01 and, therefore, can exhibit excellent dispersibility and permittivity properties.

Further, the tetragonal barium titanate particles coated with the anti-sintering agent according to the present invention are spherical particles having an average particle diameter of 0.05 to 0.5 μm and a tetragonal crystal system with a high crystallinity and, therefore, are suitable for the production of a multi-layered ceramic capacitor having a more high permittivity constant and a more low temperature dependency.

EXAMPLES

The present invention will be described in more detail hereinunder by Examples and Comparative Examples, but the Examples are only illustrative and, therefore, not intended to limit the scope of the present invention thereto.

Various properties were measured by the following methods.

(1) The average particle diameter of the particles is expressed by the average value of particle diameters of about 350 particles observed on an enlarged photograph obtained by magnifying an electron micrograph (×20,000) four times in each of longitudinal and transverse directions.

(2) The shape of the barium titanate particles was determined from the above electron micrograph.

(3) The particle size distribution of the barium titanate particles is expressed by the geometrical standard deviation σg obtained by the following method.

That is, the major axis diameters of 350 particles observed on the enlarged photograph were measured. The actual major axis diameters and the number of the particles were obtained from the calculation on the basis of the measured values. In logarithmic normal probability paper, the major axis diameters were plotted at regular intervals on the abscissa axis and the accumulative number (under integration sieve) of particles belonging to each interval of the major axis diameters was plotted on the ordinate axis by a statistical technique. The major axis diameters corresponding to the number of particles of 50% and 84.13%, respectively, were read from the graph, and the geometrical standard deviation (σg) was obtained by dividing "major axis diameter (μm) corresponding to the number of particles of 50%" by "major axis diameter (μm) corresponding to the number of particles of 84.13%". The more the geometrical standard deviation nears 1.0, the more excellent the particle size distribution of the particles.

(4) The Ba/Ti ratio was measured by a fluorescent X-ray spectroscopy device "Simultix 12" (manufactured by RIGAKU CO., LTD.).

(5) The specific surface area value was measured by BET method.

(6) The crystal structure of the barium titanate particles was determined from the diffraction peak measured in a region 2θ of 10 to 90° using an X-ray diffraction apparatus "RINT-1100K" (manufactured by RIGAKU DENKI CO., LTD.) (Bulb used: Cu).

Example 1
<Production of Barium Titanate Particles>

175.2 g (Ti: 0.600 mol) of an aqueous titanium tetrachloride solution (produced by Sumitomo Sitix of Amagasaki, Inc.; Ti content: 3.43 mol/kg) were added to 250 ml of pure water in a nitrogen atmosphere and then 557 ml of a 6.1N sodium hydroxide aqueous solution containing 11.6 g (0.121 mol) of sodium propionate were added to the obtained aqueous solution in a nitrogen atmosphere, thereby obtaining a titanium hydroxide colloid.

Then, 197.1 g of $Ba(OH)_2 \cdot 8H_2O$ (produced by KANTO KAGAKU CO., LTD.; guaranteed reagent) (Ba: 0.606 mol) was dissolved under heating in 1,000 ml of pure water, thereby obtaining an aqueous barium salt solution. The thus obtained aqueous barium salt solution was added to the titanium hydroxide colloid, and then an additional amount of pure water was added to the mixture to adjust the total volume thereof to 2,000 ml (Ba/Ti atomic ratio: 1.01; molar percentage of propionic acid to Ba: 20 mol %). The thus obtained solution was aged at 70° C. for 2 hours, thereby producing barium titanate starting particles. Then, the barium titanate starting particles contained in the solution were hydrothermally treated at 150° C. for 16 hours, and then cooled to room temperature. Thereafter, the treated particles were washed with water using a suction filter (Nutsche) until no Ba ions were recognized in the filtrate, and then filtered out and dried, thereby obtaining barium titanate particles.

It was confirmed that the obtained barium titanate particles were spherical particles having an average particle diameter of 0.2 μm and a sphericity of 1.01, and exhibited a cubic crystal system and a Ba/Ti atomic ratio of 1.001.

Then, the obtained spherical barium titanate particles were calcined at 1,020° C. for 3 hours in an electric furnace.

Figure 2:
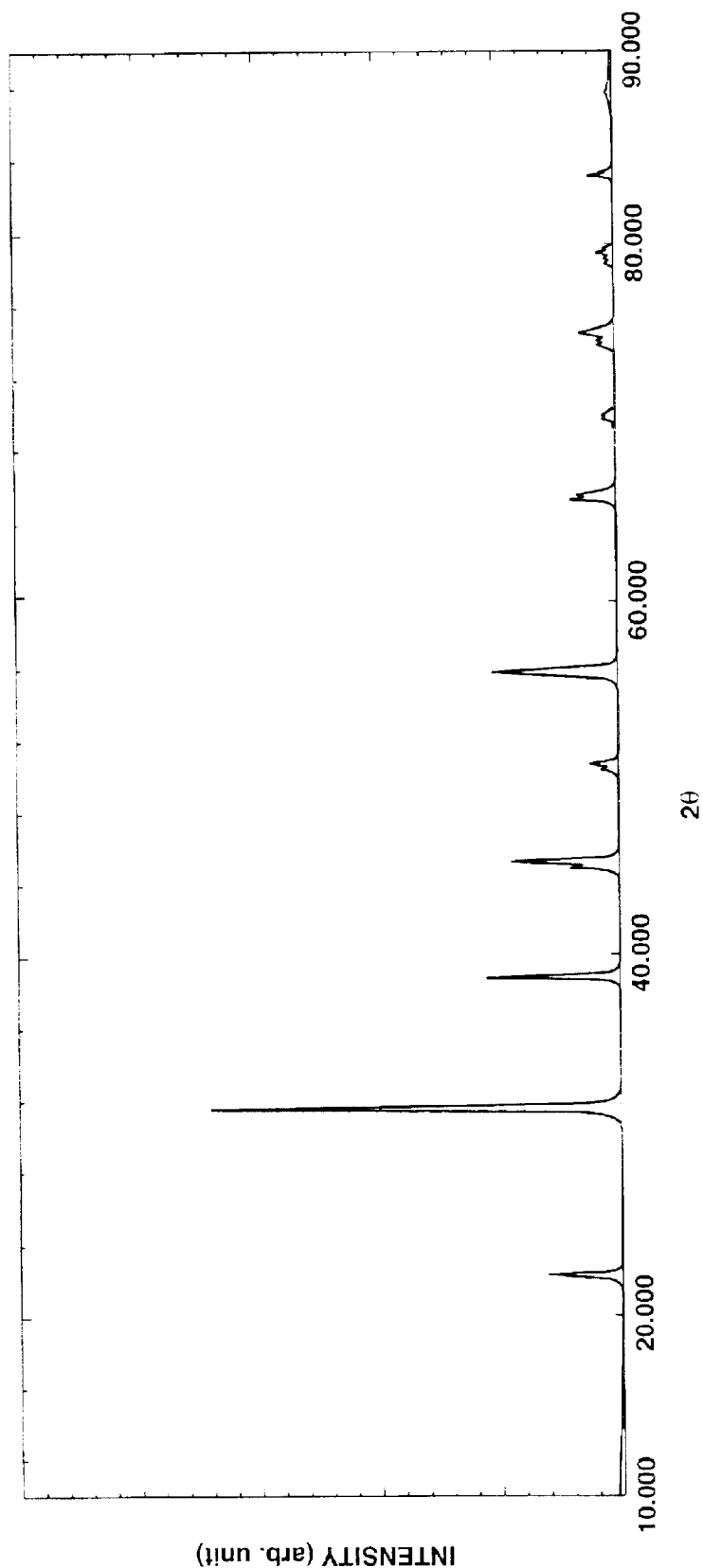
FIG. 2 is an X-ray diffraction pattern of spherical tetragonal barium titanate particles obtained in Example 1.

As shown in FIG. 1, it was confirmed that the thus obtained barium titanate particles were spherical particles having an average particle diameter of 0.22, a particle size distribution σg of 0.82 and a sphericity of 1.06, and had a perovskite crystal structure of a tetragonal and a Ba/Ti atomic ratio of 1.001. Also, as shown in FIG. 2, since no diffraction peaks attributed to substances other than $BaTiO_3$ were recognized, it was confirmed that the obtained particles were formed from single crystal of $BaTiO_3$.

<Preparation of Single Plate for Measurement of Permittivity Properties>

A dielectric composition composed of the above-obtained spherical barium titanate particles was pulverized using an attritor with an agate mortar for 5 minutes. The pulverized dielectric composition was mixed with a PVA solution containing "RS2117" (produced by KURARAY CO., LTD.) in an amount of 4% by weight, and the resultant mixture was pulverized using an attritor with an agate mortar for 10 minutes, and then passed through a 500-μm stainless steel sieve to obtain classified particles. The classified particles were dried in a dryer for 60 minutes.

After drying, 2 g of the resultant classified particles were filled in a 21.1 mmφ mold, and press-molded under a mold pressure of 1 ton/cm$^2$ for 3 seconds using a pressing machine.

The obtained molded product was placed on an alumina plate, heated to a temperature of 1,150 to 1,300° C. at a temperature rise rate of 100° C./hour in an electric furnace, and then calcined at the same temperature for 4 hours.

The thus calcined product was coated with an Ag paste, and then allowed to stand at 700° C. for 2 hours in an electric furnace, thereby obtaining a dielectric single plate having an Ag electrode baked thereon.

The permittivity constant ∈ and permittivity loss tan δ of the obtained dielectric single plate were measured at an input signal level of 1 Vrms and a frequency of 1 kHz using a LCR meter ("1 kHz/1 MHz-Capacitance Meter" manufactured by Hewlett Packard Corp.) while varying the temperature over the range of −55 to 150° C. in order to determine the permittivity thereof.

Figure 3:
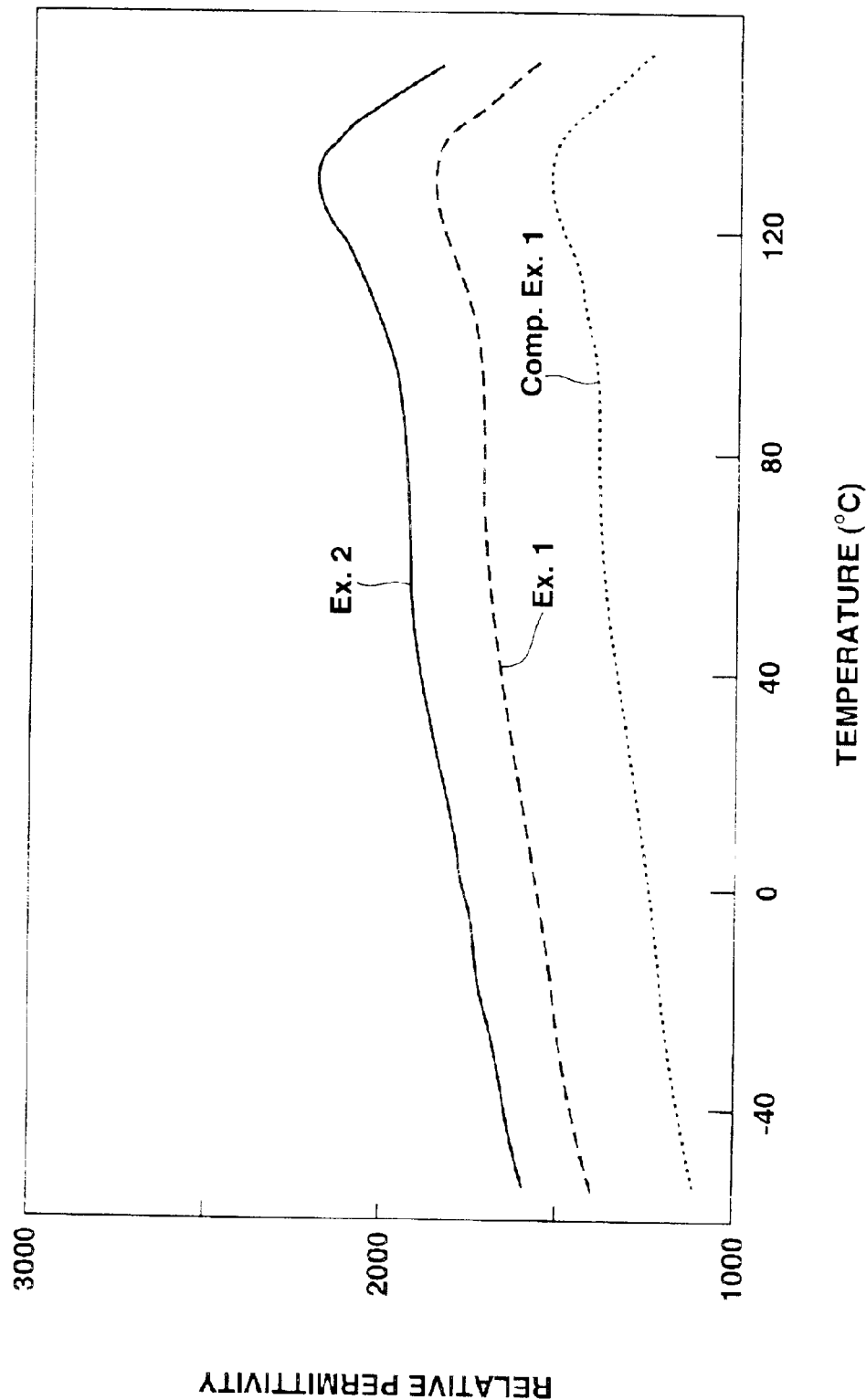
FIG. 3 is a graph showing a relationship between temperature and a permittivity constant of a dielectric composition (dielectric single plate) produced from respective barium titanate particles obtained in Example 1, Example 2 and Comparative Example 1.

The curve of the measured permittivity constant ∈ is shown in FIG. 3.

As a result, it was confirmed that the thus obtained dielectric single plate exhibited a higher permittivity constant ∈ than that of the dielectric single plate produced from the polygonal barium titanate obtained in the below-mentioned Comparative Example 1, as shown in FIG. 3.

Example 2
<Production of Barium Titanate Particles>

175.2 g (Ti: 0.600 mol) of an aqueous titanium tetrachloride solution (produced by Sumitomo Sitix of Amagasaki, Inc.; Ti content: 3.43 mol/kg) were added to 250 ml of pure water in a nitrogen atmosphere and then 557 ml of a 6.1N sodium hydroxide aqueous solution containing 11.6 g (0.121 mol) of sodium propionate were added to the obtained aqueous solution in a nitrogen atmosphere, thereby obtaining a titanium hydroxide colloid.

Then, 197.1 g of $Ba(OH)_2 \cdot 8H_2O$ (produced by KANTO KAGAKU CO., LTD.; guaranteed reagent) (Ba: 0.606 mol) was dissolved under heating in 1,000 ml of pure water, thereby obtaining an aqueous barium salt solution. The thus obtained aqueous barium salt solution was added to the titanium hydroxide colloid, and then an additional amount of pure water was added to the mixture to adjust the total volume thereof to 2,000 ml (Ba/Ti atomic ratio: 1.01; molar percentage of propionic acid to Ba: 20 mol %). The thus obtained solution was aged at 70° C. for 2 hours, thereby producing barium titanate starting particles. Then, the barium titanate starting particles were hydrothermally treated at 150° C. for 16 hours, and then cooled to room temperature. Thereafter, the treated particles were washed with water using a suction filter (Nutsche) until no Ba ions were recognized in the filtrate, and then filtered out and dried, thereby obtaining barium titanate particles.

It was confirmed that the obtained barium titanate particles were spherical particles having an average particle diameter of 0.2 μm and a sphericity of 1.01, and exhibited a cubic crystal system and a Ba/Ti atomic ratio of 1.001.

Then, 65 g of the thus obtained spherical barium titanate particles were mixed with 100 g of water, and pulverized and deaggregated using 260 g of 1 mmφ zirconia beads in a ball mill for 24 hours, thereby obtaining a slurry. The obtained slurry was mixed with 0.325 g of sodium silicate (water glass #3; 0.143% by weight (calculated as $SiO_2$) based on the weight of the barium titanate particles). Thereafter, the slurry was washed with water using a suction filter (Nutsche), and then filtered out and dried, thereby obtaining $SiO_2$-coated barium titanate particles. The thus obtained coated spherical barium titanate particles were calcined at 1,020° C. for 3 hours in an electric furnace, thereby obtaining a dielectric composition composed of the spherical barium titanate particles.

Figure 4:
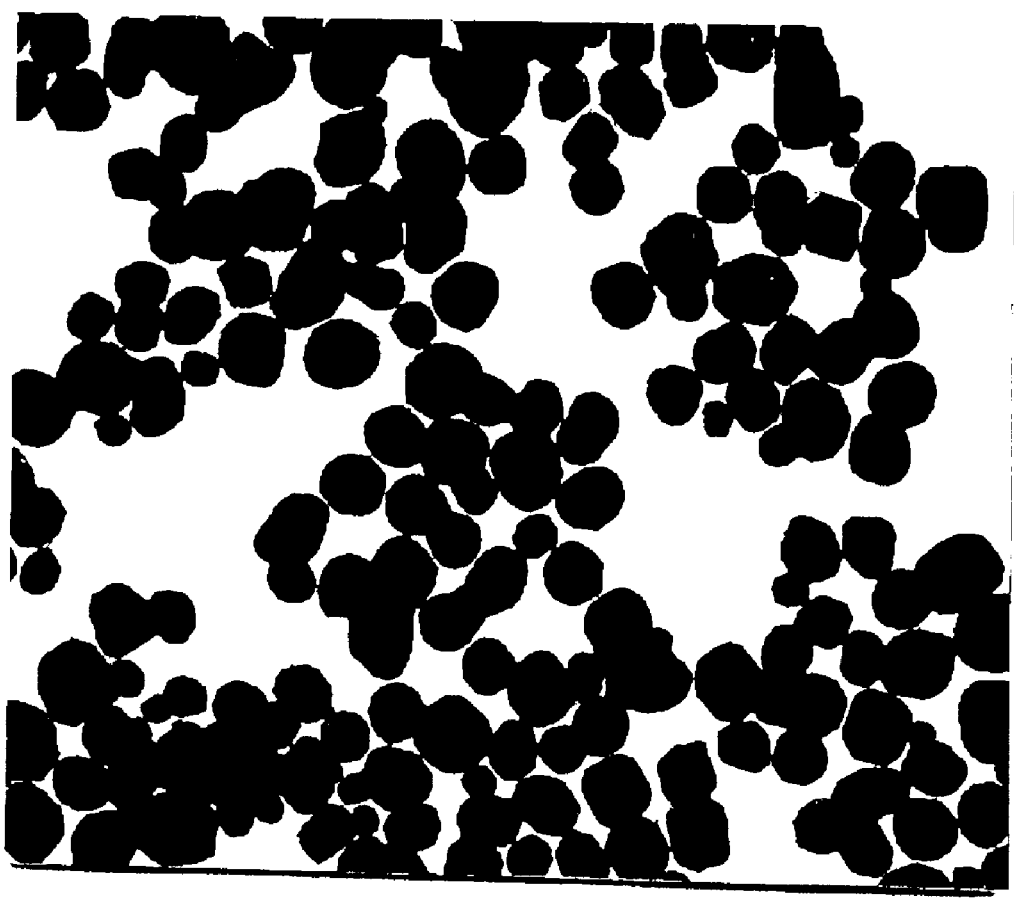
FIG. 4 is a TEM micrograph (×20,000) showing a shape of spherical tetragonal barium titanate particles obtained in Example 2.
Figure 5:
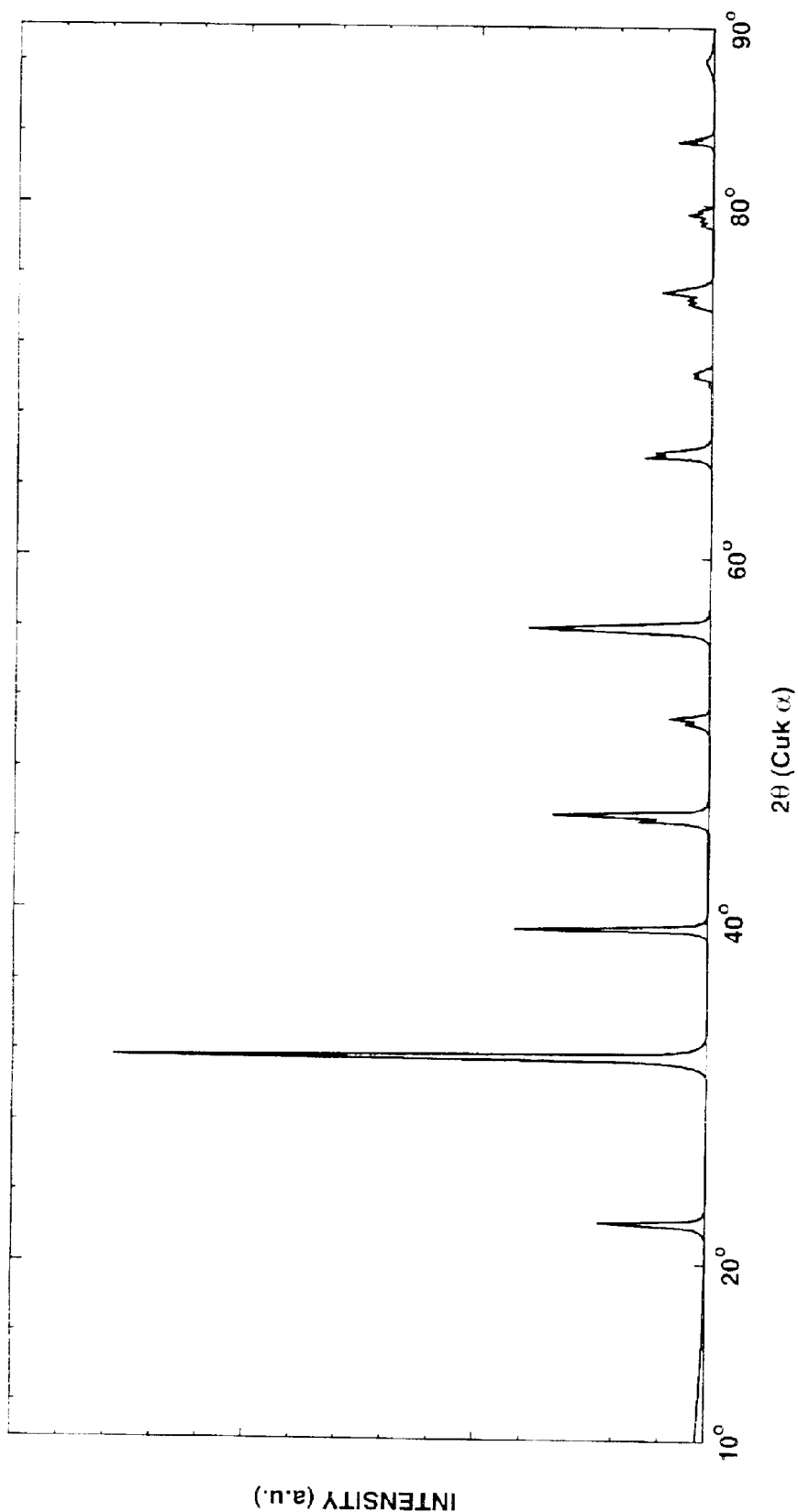
FIG. 5 is an X-ray diffraction pattern of spherical tetragonal barium titanate particles obtained in Example 2.

As shown in FIG. 4, it was confirmed that the obtained dielectric composition were constituted from spherical particles having an average particle diameter of 0.22 μm, a particle size distribution σg of 0.82 and a sphericity of 1.06, and had a Ba/Ti atomic ratio of 1.001 and a weight percentage of $SiO_2$ to $BaTiO_3$ of 0.10% by weight. Also, as apparent from FIG. 5 showing the results of X-ray diffraction analysis of the dielectric composition, since no diffraction peaks attributed to substances other than $BaTiO_3$ were recognized, it was confirmed that the dielectric composition was formed from single crystal of $BaTiO_3$ and had a perovskite crystal structure of a tetragonal. Meanwhile, $SiO_2$ was not detected by the X-ray diffraction analysis because its amount was very small.

When measured by the same method as in Example 1, it was confirmed that the permittivity constant ∈ of the above dielectric composition was higher than that of the dielectric composition produced from the barium titanate obtained in Example 1, as shown in FIG. 3.

Examples 3 to 7 and Comparative Examples 1 to 7

The same procedure as defined in Example 1 was conducted except that kind and reaction temperature of titanium salt, kind and amount of aqueous alkali solution added, kind and amount of barium salt added, kind and amount of carboxylic acid added, hydrothermally-treating temperature and calcining temperature were changed variously, thereby obtaining barium titanate particles.

Production conditions used above are shown in Tables 1 and 2, and various properties of the obtained barium titanate particles are shown in Table 3.

It was confirmed that all of the barium titanate particles obtained in Examples 3 to 7 had a tetragonal crystal system, and the permittivity constants thereof were as high as that of the particles obtained in Example 1.

Since no diffraction peaks attributed to substances other than $BaTiO_3$ were recognized, it was confirmed that the obtained particles were formed from single crystal of $BaTiO_3$.

Figure 6:
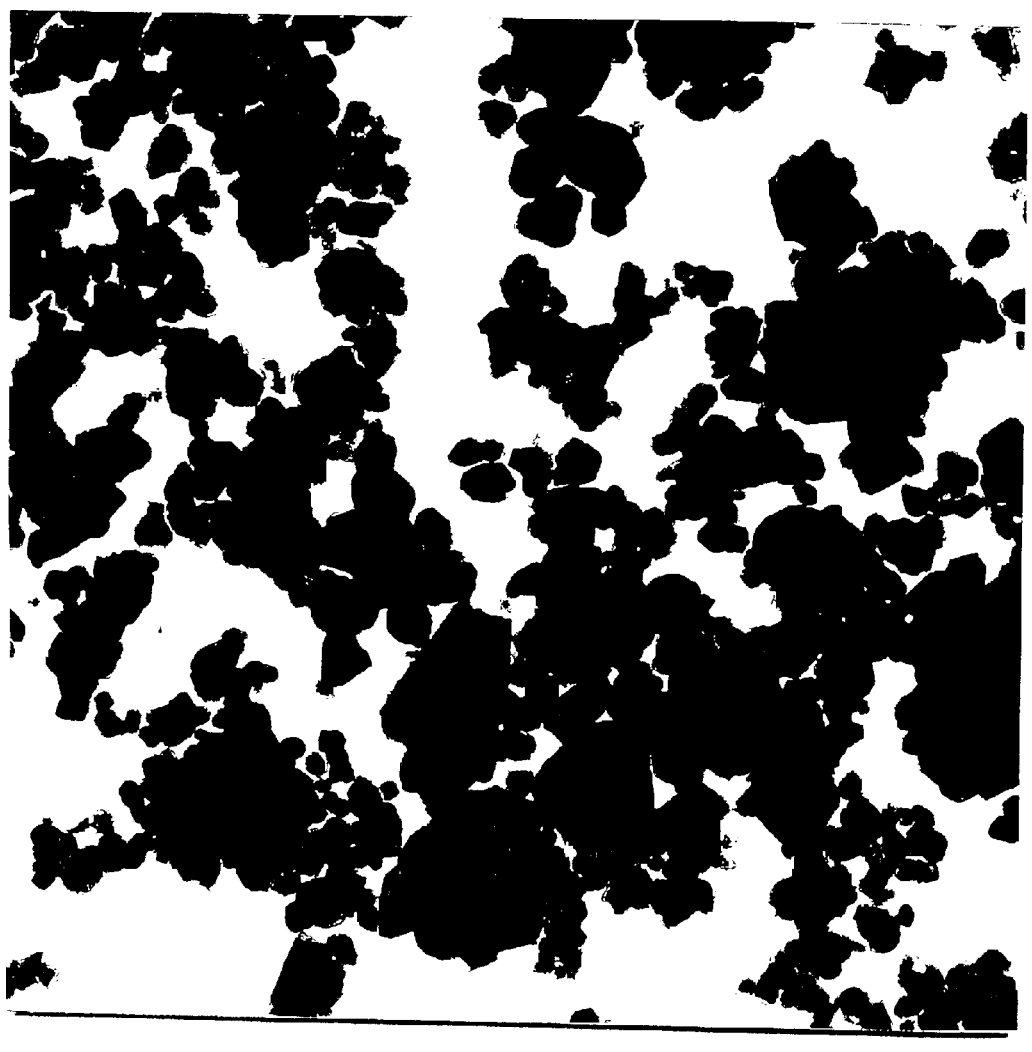
FIG. 6 is a TEM micrograph (×20,000) showing a shape of tetragonal barium titanate particles obtained in Comparative Example 1.

FIG. 6 shows an electron micrograph (×20,000) of the barium titanate particles obtained in Comparative Example 1.

Comparative Examples 8 to 10

In Comparative Example 8, the barium titanate particles were produced by the method described in Example 1 of Japanese Patent Application Laid-Open (KOKAI) No. 62-72525(1987), and calcined at 1,020° C. for 3 hours. In Comparative Example 9, the barium titanate particles were produced by the method described in Example 5 of Japanese Patent Application Laid-Open (KOKAI) No. 5-330824 (1993), and calcined at 1,020° C. for 3 hours. In Comparative Example 10, the barium titanate particles were produced by the method described in Data No. 4 of Examples of Japanese Patent Application Laid-Open (KOKAI) No. 8-119745(1996), and calcined at 1,020° C. for 3 hours.

Various properties of the obtained barium titanate particles are shown in Table 3.

Figure 7:
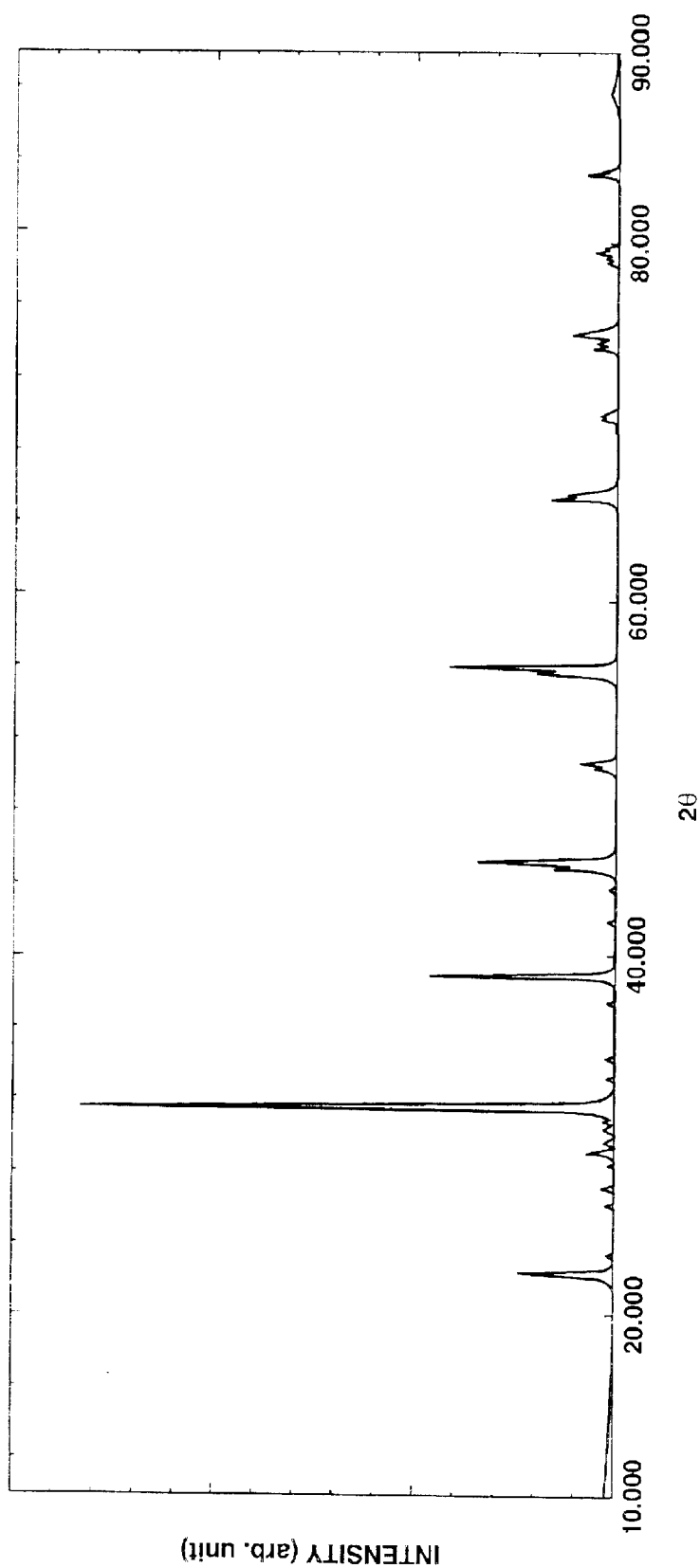
FIG. 7 is an X-ray diffraction pattern of tetragonal barium titanate particles obtained in Comparative Example 8.
Figure 8:
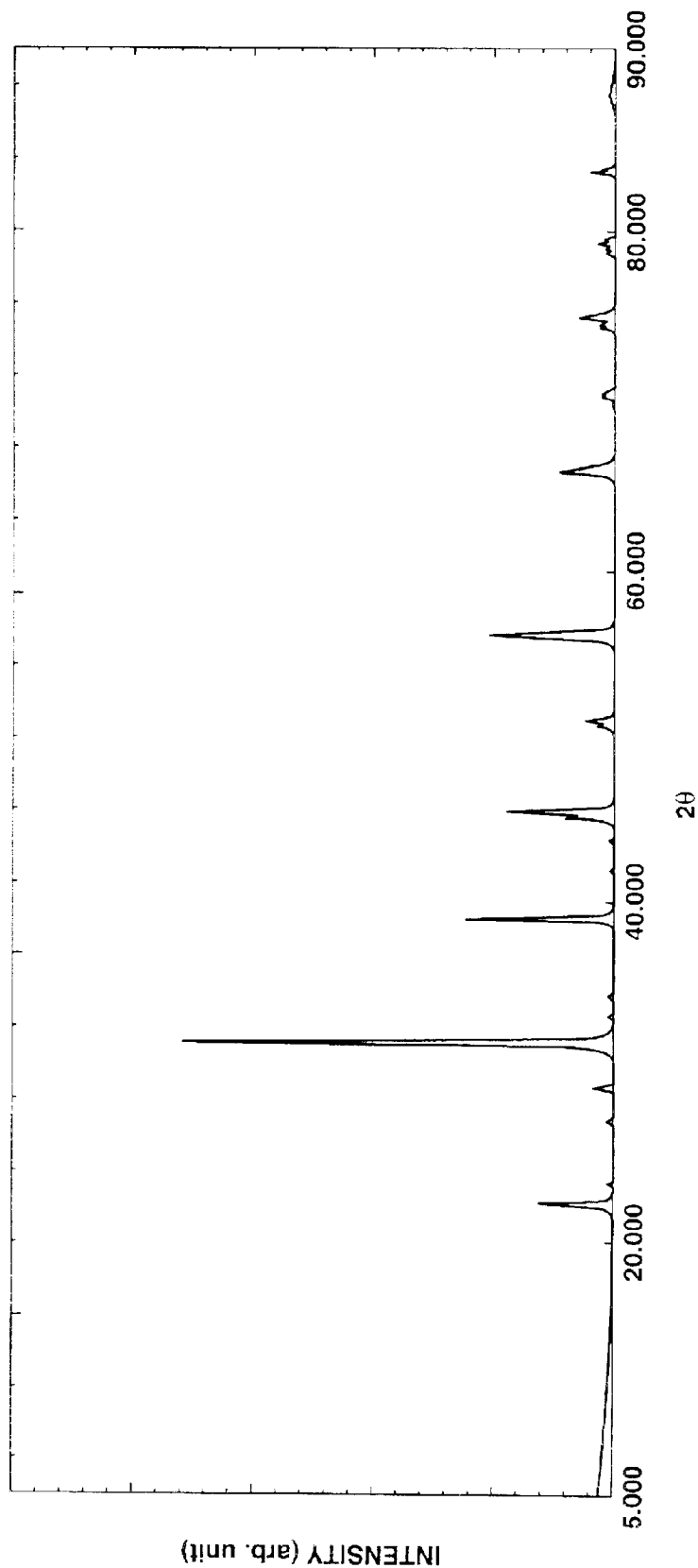
FIG. 8 is an X-ray diffraction pattern of tetragonal barium titanate particles obtained in Comparative Example 9.
Figure 9:
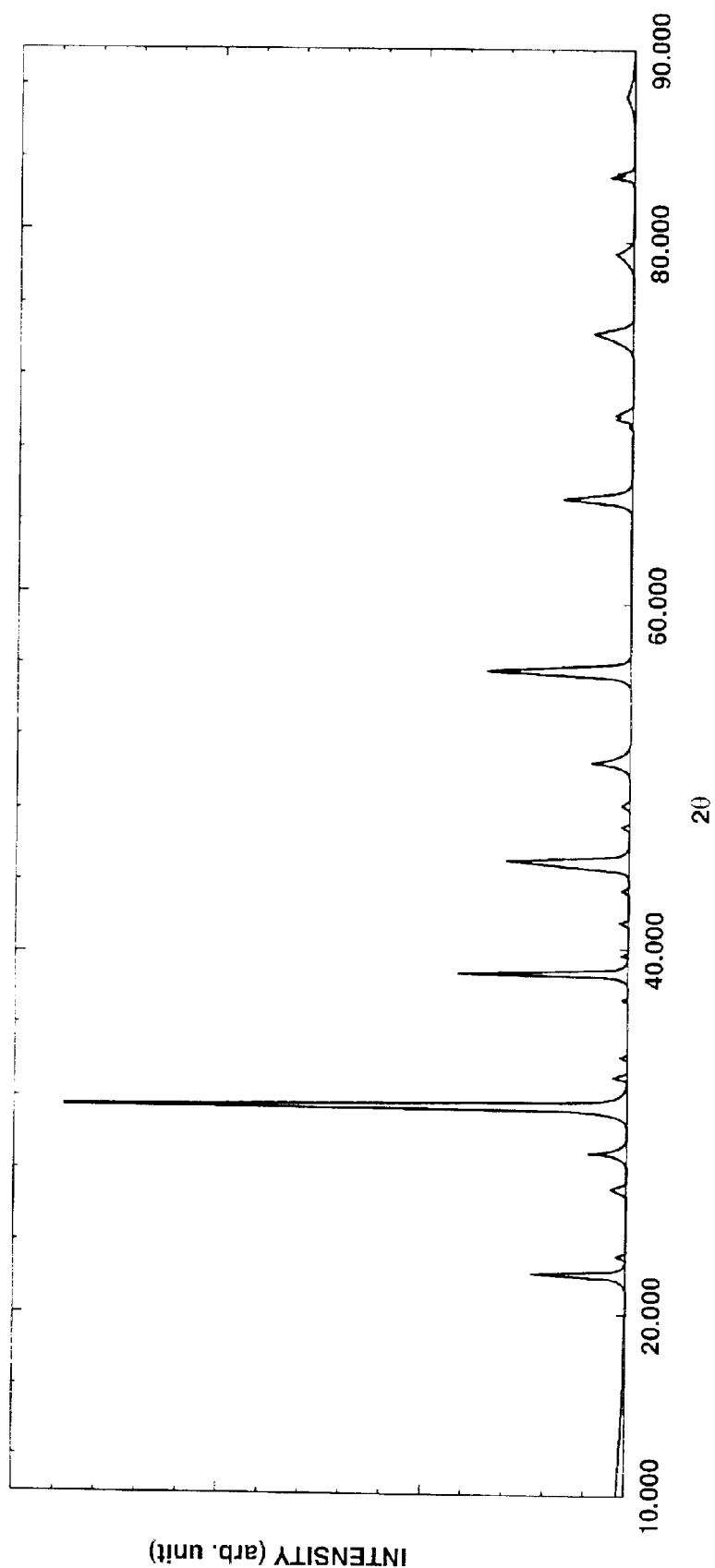
FIG. 9 is an X-ray diffraction pattern of tetragonal barium titanate particles obtained in Comparative Example 10.

The X-ray diffraction patterns of the barium titanate particles obtained in Comparative Examples 8 to 10 are shown in FIGS. 7 to 9, respectively. As apparent from these X-ray diffraction patterns, it was confirmed that since peaks attributed to substances other than $BaTiO_3$ were recognized, the obtained particles did not have a single crystal structure.

Examples 8 to 11

The same procedure as defined in Example 2 was conducted except that kind and reaction temperature of titanium salt, kind and amount of aqueous alkali solution added, kind and amount of barium salt added, kind and amount of carboxylic acid added, temperature and time of hydrothermal-treatment, kind and amount of anti-sintering agent added, and calcining temperature and time were changed variously, thereby obtaining a dielectric composition, i.e., tetragonal barium titanate particles coated with the anti-sintering agent.

Production conditions used above are shown in Tables 4 and 5, and various properties of the obtained barium titanate particles are shown in Table 6.

It was confirmed that all of the barium titanate particles obtained in Examples 8 to 11 had a tetragonal crystal system, and the permittivity constants thereof were as high as that of the particles obtained in Example 2.

Since no diffraction peaks attributed to substances other than $BaTiO_3$ were recognized, it was confirmed that the obtained particles were formed from single crystal of $BaTiO_3$.

TABLE 1

| Examples and Comparative Examples | Titanium salt Kind | Titanium salt Concentration (mol/l) | Aqueous alkali solution Kind | Aqueous alkali solution Ratio of OH/Ti added (−) | Barium salt Kind | Barium salt Ratio of Ba/Ti added (−) | Carboxylic acid Kind | Carboxylic acid Ratio of COOH/Ba added (mol %) | Properties of barium titanate starting particles before hydrothermal reaction Average major axis diameter (μm) | Properties of barium titanate starting particles before hydrothermal reaction Ba/Ti ratio (−) | Properties of barium titanate starting particles before hydrothermal reaction BET specific surface area (m²/g) |
|---|---|---|---|---|---|---|---|---|---|---|---|
| Example 3 | Titanium tetrachloride | 0.3 | NaOH | 1.2 | Barium hydroxide | 1.01 | Sodium propionate | 20 | 0.2 | 1.001 | 5.2 |
| Example 4 | Titanium tetrachloride | 0.4 | NaOH | 1.2 | Barium hydroxide | 1.01 | Sodium propionate | 40 | 0.14 | 1.002 | 7.3 |
| Example 5 | Titanium nitrate | 0.4 | KOH | 1.2 | Barium nitrate | 1.01 | Sodium acetate | 10 | 0.16 | 1.002 | 6.4 |
| Example 6 | Titanium tetrachloride | 0.3 | NaOH | 1.2 | Barium chloride | 1.01 | Sodium propionate | 30 | 0.19 | 1.001 | 5.4 |
| Example 7 | Titanium tetrachloride | 0.6 | NaOH | 1.2 | Barium chloride | 1.01 | Sodium propionate | 30 | 0.20 | 1.003 | 5.1 |
| Comparative Example 1 | Titanium tetrachloride | 0.3 | NaOH | 1.2 | Barium hydroxide | 8 | — | — | 0.01 | 1.003 | 98.4 |
| Comparative Example 2 | Titanium tetrachloride | 0.35 | NaOH | 1.2 | Barium hydroxide | 1.01 | — | — | 0.21 | 1.001 | 4.8 |
| Comparative Example 3 | Titanium tetrachloride | 0.35 | NaOH | 1.2 | Barium hydroxide | 1.01 | Sodium propionate | 10 | 0.18 | 0.998 | 13.5 |
| Comparative Example 4 | Titanium tetrachloride | 0.35 | NaOH | 1.2 | Barium hydroxide | 1.2 | Sodium propionate | 10 | 0.10 | 1.006 | 10.3 |
| Comparative Example 5 | Titanium tetrachloride | 0.35 | NaOH | 1.2 | Barium hydroxide | 0.9 | Sodium propionate | 10 | 0.19 | 0.884 | 20.3 |
| Comparative Example 6 | Titanium tetrachloride | 0.35 | NaOH | 1.2 | Barium hydroxide | 1.01 | Sodium propionate | 10 | 0.21 | 1.002 | 5.0 |
| Comparative Example 7 | Titanium tetrachloride | 0.35 | NaOH | 1.2 | Barium hydroxide | 1.01 | Sodium propionate | 10 | 0.22 | 1.002 | 4.9 |

TABLE 2

| Examples and Comparative Examples | Hydrothermal treatment Temperature (° C.) | Hydrothermal treatment Time (hr.) | Calcination Temperature (° C.) | Calcination Time (hr.) |
|---|---|---|---|---|
| Example 3 | 150 | 16 | 1,050 | 3 |
| Example 4 | 150 | 16 | 1,000 | 3 |
| Example 5 | 150 | 16 | 1,000 | 3 |
| Example 6 | 180 | 16 | 1,000 | 3 |
| Example 7 | 250 | 16 | 950 | 3 |
| Comparative Example 1 | — | — | 1,100 | 3 |
| Comparative Example 2 | 150 | 16 | 1,050 | 4 |
| Comparative Example 3 | — | — | 1,050 | 4 |
| Comparative Example 4 | 200 | 8 | 1,050 | 4 |
| Comparative Example 5 | 200 | 8 | 1,050 | 4 |
| Comparative Example 6 | 150 | 16 | 580 | 4 |
| Comparative Example 7 | 150 | 16 | 1,230 | 4 |

TABLE 3

| Examples and Comparative Examples | Properties of barium titanate particles Shape | Properties of barium titanate particles Sphericity | Properties of barium titanate particles Average particle diameter (μm) | Properties of barium titanate particles Particle size distribution (σg) (−) | Properties of barium titanate particles BET specific surface area (m²/g) | Properties of barium titanate particles Ba/Ti ratio (−) | Properties of barium titanate particles Crystallinity [ (c/a − 1) × 10³ ] (−) |
|---|---|---|---|---|---|---|---|
| Example 3 | Spherical | 1.05 | 0.23 | 0.80 | 4.6 | 1.001 | 9 |
| Example 4 | Spherical | 1.10 | 0.30 | 0.80 | 3.5 | 1.003 | 9 |

TABLE 3-continued

| Examples and Comparative Examples | Properties of barium titanate particles | | | | | | |
|---|---|---|---|---|---|---|---|
| | Shape | Sphericity | Average particle diameter (μm) | Particle size distribution (σg) (—) | BET specific surface area (m²/g) | Ba/Ti ratio (—) | Crystallinity [ (c/a − 1) × 10³ ] (—) |
| Example 5 | Spherical | 1.06 | 0.15 | 0.83 | 6.8 | 0.998 | 8 |
| Example 6 | Spherical | 1.06 | 0.20 | 0.81 | 4.9 | 1.003 | 9 |
| Example 7 | Spherical | 1.09 | 0.21 | 0.84 | 4.7 | 1.003 | 8 |
| Comparative Example 1 | Polygonal | — | 0.21 | 0.57 | 4.4 | 1.003 | 2 |
| Comparative Example 2 | Polygonal | — | 0.23 | 0.10 | 3.2 | 1.007 | 5 |
| Comparative Example 3 | Polygonal | — | 0.20 | 0.57 | 3.8 | 0.993 | 3 |
| Comparative Example 4 | Rectangular | — | 0.18 | 0.50 | 4.5 | 1.005 | 5 |
| Comparative Example 5 | Spherical | 1.10 | 0.20 | 0.78 | 4.1 | 0.860 | 0 |
| Comparative Example 6 | Spherical | 1.10 | 0.21 | 0.80 | 4.7 | 1.002 | 0 |
| Comparative Example 7 | Amorphous | — | 1.5 | 0.40 | 1.2 | 0.987 | 12 |
| Comparative Example 8 | Polygonal | — | 0.42 | 0.65 | 2.5 | 0.992 | 8 |
| Comparative Example 9 | Rectangular | — | 0.23 | 0.74 | 2.8 | 1.002 | 8 |
| Comparative Example 10 | Polygonal | — | 0.51 | 0.58 | 2.1 | 0.997 | 8 |

TABLE 4

| Examples and Comparative Examples | Titanium salt | | Aqueous alkali solution | | Barium salt | | Carboxylic acid | | Hydrothermal treatment | |
|---|---|---|---|---|---|---|---|---|---|---|
| | Kind | Concentration (mol/l) | Kind | Ratio of OH/Ti added (—) | Kind | Ratio of Ba/Ti added (—) | Kind | Ratio of COCH/Ba added (mol %) | Temperature (° C.) | Time (hr.) |
| Example 2 | Titanium tetrachloride | 0.35 | NaOH | 1.2 | Barium hydroxide | 1.01 | Sodium propionate | 20 | 150 | 16 |
| Example 8 | Titanium sulfate | 0.30 | KOH | 1.4 | Barium chloride | 1.01 | Acetic acid | 10 | 200 | 8 |
| Example 9 | Titanium tetrachloride | 0.40 | NaOH | 1.47 | Barium nitrate | 1.01 | Potassium acetate | 15 | 250 | 8 |
| Example 10 | Titanium tetrachloride | 0.35 | NaOH | 1.47 | Barium hydroxide | 1.02 | Sodium propionate | 20 | 275 | 4 |
| Example 11 | Titanium tetrachloride | 0.40 | NaOH | 1.47 | Barium hydroxide | 1.005 | Propionic acid | 10 | 250 | 8 |

TABLE 5

| Examples and Comparative Examples | Properties of barium titanate starting particles | | | Surface-coating treatment | | | Calcination | |
|---|---|---|---|---|---|---|---|---|
| | Average major axis diameter (μm) | Ba/Ti ratio (—) | BET specific surface area (m²/g) | Element | Kind | Amount added (wt. %) | Temp. (° C.) | Time (hr.) |
| Example 2 | 0.2 | 1.001 | 5.2 | Si | Water glass #3 | 0.143 | 1,020 | 3 |
| Example 8 | 0.18 | 1.002 | 5.8 | Si | Water glass #3 | 0.100 | 1,050 | 4 |
| Example 9 | 0.25 | 1.001 | 4.3 | Y | Yttrium nitrate | 0.10 | 1,100 | 3 |
| Example 10 | 0.15 | 1.001 | 6.9 | Nd | Neodymium chloride | 0.12 | 1,080 | 3 |
| Example 11 | 0.13 | 1.001 | 7.5 | Si | Ethyl silicate | 0.075 | 1,100 | 3 |

TABLE 6

| Examples and Comparative Examples | Shape | Sphericity | Average particle diameter (μm) | Particle size distribution (σg) (−) | BET specific surface area (m²/g) | Ba/Ti ratio (−) | Anti-sintering agent Kind | Amount coated (wt. %) | Crystal system | Crystallinity [ (c/a − 1) × 10³ ] (−) |
|---|---|---|---|---|---|---|---|---|---|---|
| Example 2 | Spherical | 1.06 | 0.22 | 0.82 | 3.3 | 1.001 | $SiO_2$ | 0.1 | Tetragonal | 11 |
| Example 8 | Spherical | 1.05 | 0.20 | 0.80 | 3.4 | 1.001 | $SiO_2$ | 0.09 | Tetragonal | 10 |
| Example 9 | Spherical | 1.07 | 0.25 | 0.81 | 3.0 | 1.001 | $Y_2O_3$ | 0.1 | Tetragonal | 11 |
| Example 10 | Spherical | 1.04 | 0.17 | 0.83 | 4.3 | 1.001 | $Nd_2O_3$ | 0.12 | Tetragonal | 8 |
| Example 11 | Spherical | 1.03 | 0.15 | 0.83 | 4.8 | 1.001 | $SiO_2$ | 0.07 | Tetragonal | 8 |

What is claimed is:

1. Spherical tetragonal barium titanate particles with a perovskite crystal structure, having an average particle diameter of 0.05 to 0.5 μm, a particle size distribution σg of not less than 0.70, a ratio of Ba to Ti of 0.99:1 to 1.01:1 and a sphericity (maximum diameter/minimum diameter) of 1.0 to 1.4.

2. Spherical tetragonal barium titanate particles according to claim 1, which have a BET specific surface area value of 2 to 20 m²/g.

3. A process for producing the spherical tetragonal barium titanate particles with a perovskite crystal structure, having an average particle diameter of 0.05 to 0.5 μm, a particle size distribution σg of not less than 0.70, and a ratio of Ba to Ti of 0.99:1 to 1.01:1, which process comprises:

adding an aqueous barium salt solution to a titanium hydroxide colloid in the presence of a carboxylic acid in an amount of 1 to 60 mol % based on barium contained in the aqueous barium salt solution, thereby producing barium titanate starting particles;

hydrothermally treating a resultant reaction solution containing the barium titanate starting particles at a temperature of 100 to 350° C., thereby obtaining spherical cubic barium titanate particles; and calcining the spherical barium titanate particles at a temperature of 500 to 1,200° C. to transform the spherical cubic barium titanate particles into the spherical tetragonal barium titanate particles.

4. Spherical tetragonal barium titanate particles with a perovskite crystal structure, having an average particle diameter of 0.05 to 0.5 μm, a particle size distribution σg of not less than 0.70, a ratio of Ba to Ti of 0.99:1 to 1.01:1, a sphericity (maximum diameter/minimum diameter) of from 1.0 to 1.4 and a BET specific surface area value of 2 to 20 m²/g.

5. Spherical tetragonal barium titanate particles with a perovskite crystal structure, having an average particle diameter of 0.05 to 0.4 μm, a particle size distribution σg of 0.75 to 0.9, a ratio of Ba to Ti of 0.99:1 to 1.01:1, a sphericity (maximum diameter/minimum diameter) of 1.0 to 1.4 and a BET specific surface area value of 2 to 15 m²/g.

* * * * *